United States Patent Office 2,860,143
Patented Nov. 11, 1958

2,860,143

WETTING AGENTS AND THEIR PREPARATION

William E. Thompson, Wallingford, Pa., assignor to Sun Oil Company, Philadelphia, Pa., a corporation of New Jersey No Drawing. Application March 2, 1956
Serial No. 568,982

7 Claims. (Cl. 260—309.6)

This invention relates to new compositions of matter having wetting properties and to the preparation of such compositions.

The new compositions according to the present invention are salts of nitrogen bases with partially oxidized alkyl-substituted cyclic sulfonic acids.

The nitrogen base salts of alkyl-substituted cyclic sulfonic acids, are a well known class of surface active agents having useful properties as wetting agents, detergents, demulsifying agents, etc. Numerous members of this class are disclosed in previous publications as having useful properties of the types indicated. Some of these publications are referred to subsequently in this specification.

Alkyl-substituted cyclic sulfonic acids include various well known types of materials such as alkyl benzene sulfonic acids, alkyl naphthalene sulfonic acids, corresponding cycloaliphatic sulfonic acids, mixtures predominating in cyclic sulfonic acids such as petroleum mahogany sulfonic acids, petroleum green sulfonic acids, etc. Preferred cyclic sulfonic acids, for the purpose of the invention, are the oil-insoluble petroleum sulfonic acids, commonly known as green acids, which are prepared by sulfonation of petroleum in a manner known in the art. Typical sulfonation charge stocks for the preparation of such acids are petroleum lubricating oil fractions, which contain for example, 15 to 50 weight percent of compounds containing at least one aromatic ring. In typical sulfonations, the aromatic compound content is substantially reduced as a result of sulfonation of aromatic hydrocarbons, so that the product oil after separation of sulfonic acids may contain for example 5 to 40 weight percent less aromatic hydrocarbons than the sulfonation charge.

Green sulfonic acids are predominantly cyclic in character, i. e. they contain a major proportion of cyclic sulfonic acids including aromatic and naphthene sulfonic acids. The same is true of the oil-soluble mahogany sulfonic acids, though the average number of aromatic rings per molecule for the latter acids is generally less than for the green acids obtained from the same sulfonation charge stock. Thus, for a typical green acid fraction, the hydrogen to carbon atomic ratio may be about 1.4, while the hydrogen to carbon atomic ratio for mahogany acids obtained from the same charge may be about 1.5, indicating a less highly aromatic structure.

Typical green acids have by analysis been indicated to contain an average sum of rings and aromatic double bonds of 8, indicating a predominance of alkyl naphthalene structure. Mahogany acids may typically have a sum of 7 rings and double bonds, indicating again slightly less aromatic nature than the green acids.

According to the present invention, cyclic sulfonic acids are partially oxidized to produce additional carboxyl acidity in the sulfonic acid molecule, and nitrogen base salts of the oxidation products are prepared. It has been found that products having superior wetting properties are obtained in this manner.

The partial oxidation can be performed in a variety of ways, e. g. by contacting an aqueous solution of the sulfonates with air or other free-oxygen containing gas in the presence of a catalyst of the well-known metallic salt type, e. g. manganese naphthenate, or by contact with ozone-containing gas in the presence or absence of an oxidation catalyst, or by other known means of oxidizing organic materials.

A preferred method of oxidation is by contacting sulfonic acids or sulfonates, e. g. alkali metal sulfonates, with ozone or an ozone-containing gas under reactive temperature conditions. Preferred temperatures for the ozonization are those within the range from 100° F. to 200° F. In the case of green sulfonic acids, the acids may be ozonized directly after separation from the acid oil product of the sulfonation. Alternatively, the green acids may be de-oiled and/or desalted by known methods prior to the ozonization.

The oxidized acids obtained by partial oxidation contain acid-reacting groups not present prior to oxidation. These groups are formed during the oxidation, presumably by reaction of ozone or oxygen with the hydrocarbon portion of the sulfonic acid or sulfonate molecule, or with the unsulfonated oil admixed with the green acids in the case where green sulfonic acids, not completely de-oiled prior to oxidation, are used as oxidation charge. The extent to which the acidity of the sulfonic acids is increased by the oxidation depends on the oxidation conditions, such as oxygen rate, temperature, duration of oxidation, etc. In the light of the present specification, the conditions to obtain the desired extent of acidity increase can be chosen by a person skilled in the art.

The salts of the invention can be prepared by partially oxidizing inorganic cation salts, e. g. alkali metal or alkaline earth metal salts, of sulfonic acids to generate acidity, then neutralizing the generated acidity with nitrogen base. Preferably the amount of base used is within the approximate range from 0.1 to 1.0 equivalent of base per mole of sulfonic acids (based on the molecular weight of the sulfonic acids prior to oxidation), more preferably in the range from 0.2 to 0.5 equivalent of base per mole of sulfonic acids. It has surprisingly been found that relatively small amounts of base produce a large improvement in wetting and rewetting properties over those of oxidized sulfonic acids completely neutralized with an inorganic cation.

Alternatively, salts can be prepared by partially oxidizing inorganic cation salts of sulfonic acids to generate acidity, acidifying the oxidized sulfonates to obtain the free acids, and then neutralizing all or a part of the total acidity with nitrogen base. Or, salts can be prepared by partially oxidizing sulfonic acids in the free acid form and then neutralizing all or a part of the total acidity with a nitrogen base. Here again it is preferred that 0.1 to 1.0 equivalent of base per mole of sulfonic acids be employed. It will be noted that use of 1.0 equivalent of base per mole of sulfonic acids is only a partial neutralization, since the calculation is made on the basis of the acids prior to oxidation, and the acids after oxidation contain additional acidic groups. More preferably 0.2 to 0.5 equivalent of base per mole of sulfonic acids are employed. The remainder of the acidic groups in the sulfonic acids may be neutralized with an inorganic cation.

Any suitable salt-forming nitrogen base may be employed in preparing the salts of the invention. Ammonia, hydrazine, aliphatic monoamines, diamines and other polyamines, and alicyclic amines such as those listed in Tables I, II and III of Kirk and Othmer's Encyclopedia of Chemical Technology, volume 1, pages 706-7 (1947), aromatic monoamines, diamines, and heterocyclic amines as listed on pages 712-13 of the same volume, aminoalcohols such as ethanolamine, diethanolamine, triethanolamine and homologs thereof, aminophenols, salt-forming heterocyclic nitrogen compounds such as pyrrole, indole, carbazole, pyrazole, pyrazoline, indazole, imidazoline, imidazolines, benzimidazoles, oxazoles, benzoxazoles, benzothiazol, benzotriazol, pyridine, piperidine, melamine, etc. can be employed.

Preferred nitrogen bases for use according to the invention are imidazolines. Any suitable imidazoline can be employed to react with the oxidized green acids. An imidazoline is a heterocyclic nitrogen compound having a five-membered ring with carbon atoms in the 2, 4 and 5 positions and nitrogen atoms in the 1 and 3 positions, and one double bond only in the heterocyclic ring, which double bond is in the 2,3 position.

Preferred imidazolines are those having the following formula:

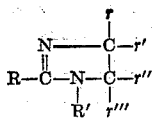

where R is a radical selected from the group consisting of hydrogen, alkyl radicals, alkenyl radicals, and naphthenyl radicals, where R' is a radical selected from the group consisting of hydrogen, alkyl radicals, alkenyl radicals, hydroxyalkyl radicals, and aminoalkyl radicals, where R and R' each contain not more than 25 carbon atoms and have molecular weight not greater than 350, and where $r, r', r'', r'''$ each are selected from the group consisting of hydrogen and alkyl radicals having not more than 5 carbon atoms.

Examples of the preferred imidazolines are the following: 1-hydroxyethyl-2-decyl imidazoline, 1-hydroxyethyl-2-dodecyl imidazoline, 2-heptadecyl imidazoline, 1-decenyl-2-hexyl imidazoline, 2-naphthenyl imidazoline, 1-methyl-4,5-dimethyl imidazoline, 1-decyl-4-ethyl imidazoline, 1-benzyl-2-butyl imidazoline, etc. The corresponding benzimidazoles are also preferred bases for use according to the invention.

The new compositions of matter according to the invention are useful in a variety of applications as wetting agents, detergents, demulsifiers, corrosion inhibitors for use in oil wells, mineral oil additives, etc.

The following examples illustrate the invention:

*Example 1*

A furfural-refined naphthenic lubricating oil was sulfonated by contact with a gaseous mixture of sulfur trioxide and air under sulfonation conditions. The oil-insoluble, or green acid, product was separated from the oil layer of the sulfonation product mixture and saponified with a slight excess of caustic soda to produce the following composition:

| Component: | Weight percent |
|---|---|
| Sodium green sulfonate | 27.8 |
| Sodium carboxylate | 0.2 |
| Sodium hydroxide | 0.3 |
| Inorganic salts | 10.2 |
| Water | 47 |
| Oil | 14.2 |

The combining weight of the sulfonic acids was 373, i. e. one mole of sodium hydroxide was required to neutralize 373 parts by weight of sulfonic acids.

The above composition was diluted until the water content was 85 percent and then treated with ozonized air obtained from a Welsbach generator and containing 1 to 2 percent ozone, the temperature of the ozonization being about 175° F. After about 8 hours, the ozonization was terminated. The amount of ozone reacted with the charge material was calculated by difference between the amount generated, as measured by standard iodine titration methods, and the amount remaining in the air after contact with the charge material, similarly measured. The amount of ozone reacted, calculating back from an 85 percent solution, was found to be 12 weight percent ozone in a 50 weight percent aqueous solution of the charge material.

One portion of the ozonized material was reacted with "Alro Amine C," a mixture of 1-hydroxyethyl-2-decyl imidazoline and 1-hydroxyethyl-2-dodecyl imidazoline, the mixture having average molecular weight of 276. The reaction was conducted by stirring together at room temperature 0.0966 gram of Alro Amine C per 100 cc. of an 0.34 weight percent solution of sulfonates in water, the concentration of sulfonates being calculated on the basis of the weight of sulfonates present in the charge material prior to ozonization; in other words, no attempt was made to take into account the increase in weight of the sulfonates as a result of the ozonization. Assuming that the specific gravity of the 0.34% solution was 1, the ratio of Alro Amine C to sulfonic acids (based on sulfonic acids prior to ozonization) was (0.0966) (373)/(0.34) (276), or about 0.385 equivalent of Alro Amine C per mole of sulfonates. The product was a salt of ozonized material, whose sulfonic acid groups were neutralized by sodium and whose additional acidic groups produced by oxidation were neutralized by Alro Amine C. The ratio of sodium to sulfonic acids (based on sulfonic acids prior to ozonization) was at least 1 equivalent per mole of sulfonic acids, and was greater than 1 if the sulfonic acids included acids having more than one sulfonic acid group per molecule.

Another portion of the ozonized material was neutralized by reacting with 2.0 cc. of 1 NNaOH per 100 cc. of an 0.34% aqueous sulfonate solution. The wetting and re-wetting properties of the two portions were tested according to the following procedure: In the wetting test, a 0.3 percent solution of the salt in water was prepared, and a one inch circle of standard cotton duck was placed flat on the surface of the solution at 77° F. in a beaker. The time required for the cloth to become wetted and sink to the bottom of the beaker is the wetting time. In the re-wetting test, the immersed cloth is removed from the solution and dried overnight in an oven at 160° F. The dried cloth is placed flat on the surface of water in a beaker. The time required for the cloth to become wetted and sink to the bottom of the beaker is the re-wetting time.

The following table shows the results:

| Material | Time in Seconds | |
|---|---|---|
| | Wetting | Re-wetting |
| A. Ozonized acids completely neutralized with sodium | 600 | 125 |
| B. Ozonized acids neutralized partly with Alro Amine C | 90 | 20 |

This table shows that remarkably rapid wetting and re-wetting are obtained when ozonized acids are neutralized with only 0.385 equivalent of nitrogen base per mole of sulfonic acids, and that a remarkably great increase in rapidity of wetting and re-wetting is obtained when a relatively small portion of the sodium used for neutralization in Material A is replaced by a nitrogen base.

For comparison, a procedure was carried out similar to that previously described in this example, except that the ozonization was terminated when 6 weight percent, rather than 12 weight percent, of ozone had reacted, and an appropriately smaller amount of Alro Amine C was used for neutralization. The following table shows the results:

| Material | Time in Seconds | |
|---|---|---|
| | Wetting | Re-wetting |
| B. Ozonized acids (12% O₃) neutralized partly with Alro Amine C | 90 | 20 |
| C. Ozonized acids (6% O₃) neutralized partly with Alro Amine C | 115 | 45 |

These results show that increasing the extent of partial oxidation improves the wetting and re-wetting properties of the nitrogen base salts of the oxidation product.

*Examples 2 to 6*

An oxidation product as described in Example 1 can be neutralized with a suitable amount, e. g. about 0.385 mole equivalent per mole of sulfonates, of various other nitrogen bases, instead of with 0.385 mole equivalent per mole of Alro Amine C as used in Example 1, to obtain nitrogen base salts having highly satisfactory wetting properties. Thus, ammonia, methylamine, ethylene diamine, diethanolamine, and pyridine respectively can be employed to make the salts. Generally similar results are obtained when other nitrogen bases are employed of the well known class whose salts with cyclic sulfonic acids have wetting properties.

Generally similar results are also obtained when other cyclic sulfonic acids than the green acids, are employed, e. g. alkyl benzene sulfonic acids, alkyl naphthalene sulfonic acids, mahogany acids, etc., and when other partial oxidation procedures than ozonization are employed, which procedures are adapted to produce additional carboxyl acidity in the sulfonic acid molecule.

The present invention constitutes an improvement over the prior art class of surface active agents comprising nitrogen base salts of cyclic sulfonic acids containing acylic side chains. Examples of the prior art agents of this class are provided by the following United States patents: Warren T. Reddish, 1,780,144, October 28, 1930, mono, di or tri alkyl or aryl hydroxy amine salts of mineral oil sulfonic acids; Truman B. Wayne, 2,050,639, August 11, 1936, alkyl amine salts of alkyl naphthalene sulfonic acids; Fritz Gunther, 2,130,668, September 20, 1938, aliphatic amine, aromatic amine, alkanolamine, or pyridine salts of mineral oil sulfonic acids or other alkyl aromatic sulfonic acids; James Emory Kirby, 2,220,929, November 12, 1940, ammonium, alkanolamine, or alkylamine salts of mineral oil sulfonic acids; Lloyd C. Daniels and Edward L. Kropa, 2,223,935, December 3, 1940, amidine salts of alkyl naphthalene sulfonic acids; and Frank J. Cahn and Morris B. Katzman, 2,236,515, April 1, 1941, alkanolamine, alkylol polyamine, alkyl amine, aromatic amine, heterocyclic nitrogen base, etc. salts of alkyl naphthalene sulfonic acids. Numerous other publications disclose surface active agents comprising nitrogen base salts of cyclic sulfonic acids containing acyclic side chains.

This application is a continuation-in-part of copending application Serial No. 403,041 filed January 8, 1954 by the present inventor, and now abandoned.

The invention claimed is:

1. Method for preparing wetting agents which comprises: partially oxidizing by means of oxygen-containing gas a charge stock containing a major proportion of a material selected from the group consisting of alkyl-substituted cyclic sulfonic acids, alkali metal salts thereof, and alkaline earth metal salts thereof, until carboxyl acidity has been produced requiring for neutralization 0.1 to 1.0 mole of sodium hydroxide per mole of the original sulfonic acids; and admixing the oxidation product containing carboxyl groups with a nitrogen base, thereby to neutralize carboxyl groups with said nitrogen base.

2. Method according to claim 1 wherein said base is an imidazoline.

3. Method according to claim 1 wherein said base is an alkyl monoamine.

4. Method according to claim 1 wherein said base is an alkylene polyamine.

5. Method according to claim 1 wherein said base is an alcoholamine.

6. Method according to claim 1 wherein said base is ammonia.

7. Method according to claim 1 wherein said gas is ozonized air.

References Cited in the file of this patent

UNITED STATES PATENTS

| 2,289,760 | Dickey et al. | July 14, 1942 |
| 2,543,223 | Blair | Feb. 27, 1951 |